May 11, 1937. F. R. EDGARTON 2,079,990
ANTISKID DEVICE
Filed Dec. 27, 1935   2 Sheets-Sheet 1
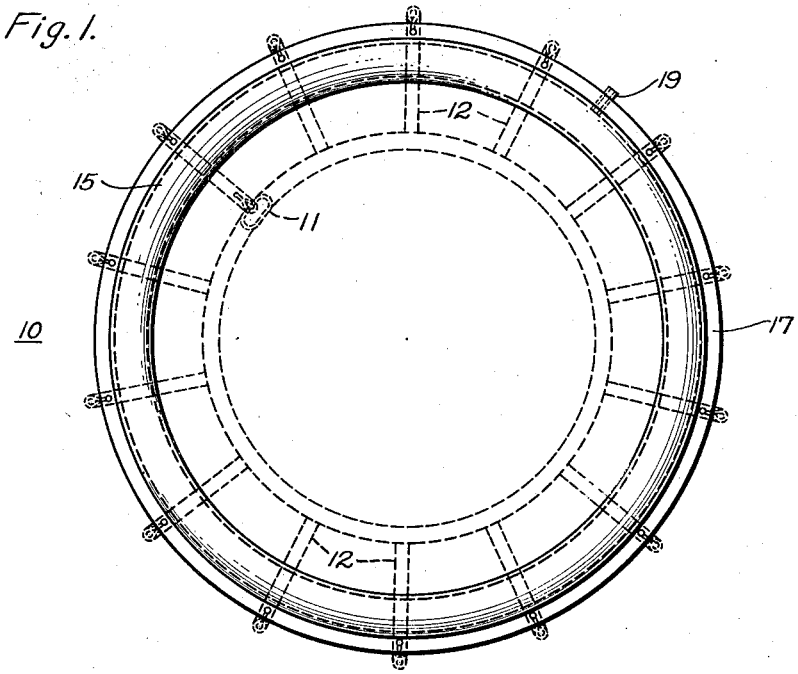
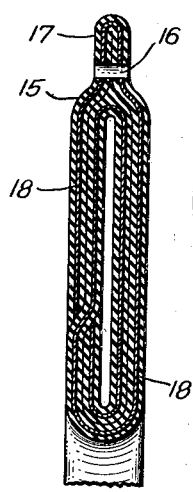
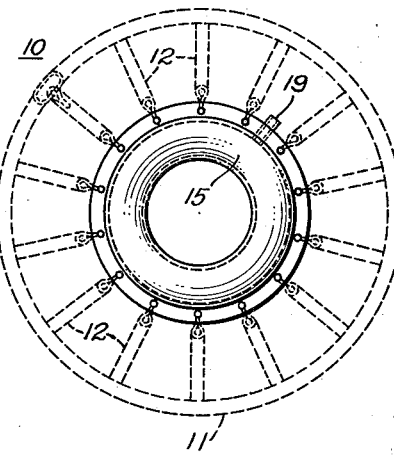
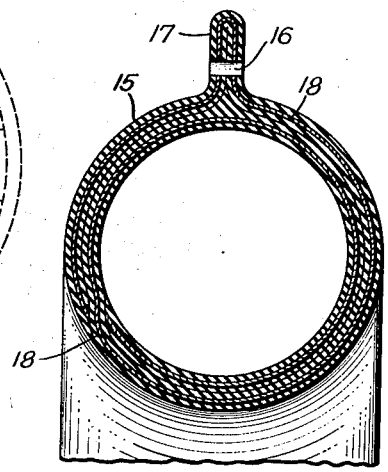
WITNESS
INVENTOR
Frank R. Edgarton.
BY Lockwood
ATTORNEY May 11, 1937.  F. R. EDGARTON  2,079,990
ANTISKID DEVICE
Filed Dec. 27, 1935    2 Sheets-Sheet 2
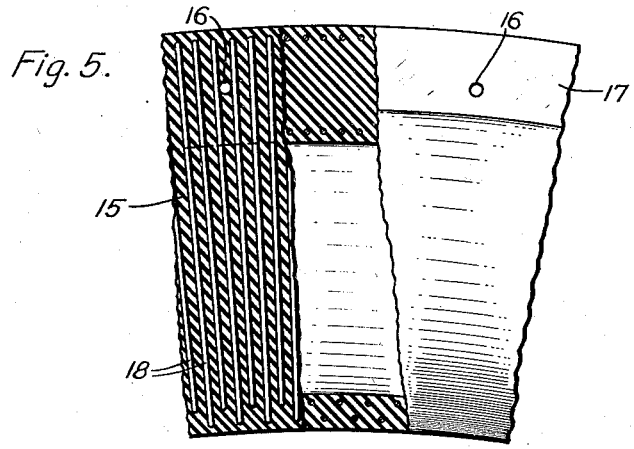
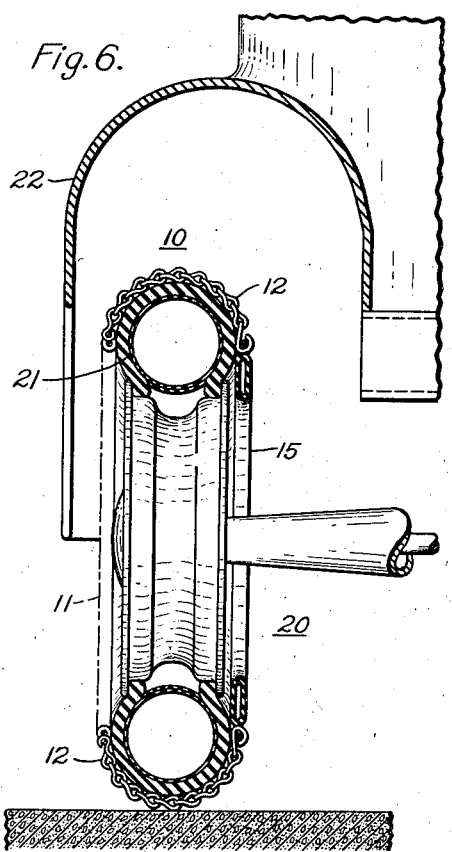
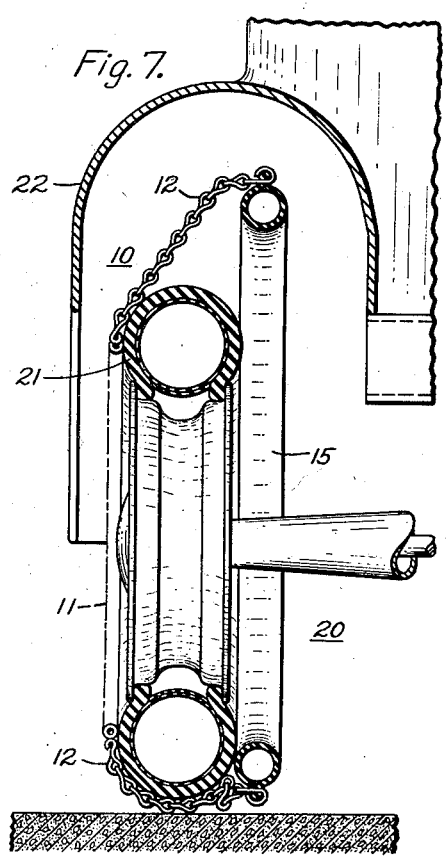

Patented May 11, 1937

2,079,990

UNITED STATES PATENT OFFICE 2,079,990

ANTISKID DEVICE

Frank R. Edgarton, Pittsburgh, Pa.

Application December 27, 1935, Serial No. 56,345

10 Claims. (Cl. 152—14)

My invention relates, generally, to retaining devices, and it has particular relation to antiskid devices for vehicle wheels.

In the past, vehicle antiskid devices, such as tire chains, have been constructed by employing two side chain members interconnected by cross chains. The side chain members are provided with suitable fastening devices or hooks, by means of which the chain may be secured in place on the wheel. Various types of fastening devices have been provided in the prior art. All of these are open to the objection that they do not permit the chains to be tightly secured to the tire. Moreover, it is difficult to apply them to and remove them from the vehicle wheel. Even when applied and pulled as tightly as possible with the fastening devices of the prior art, it has not been possible to tightly secure the chains to the surface of the tire.

Various types of tightening devices have been provided in the prior art. In general, these devices are in the form of springs secured to an endless chain of small diameter. The springs are provided with hooks at their outer ends which are arranged to be fastened into the outside chain member. Such devices have the disadvantage that they do not provide a sufficient tension to overcome the centrifugal force of the cross chains when the vehicle is driven at a fair rate of speed. As a result, the cross chains lift off from the tire, and in many instances, strike the fender covering the wheel. Such types of tensioning devices also tend to mar the hub caps of certain types of vehicle and for this further reason, their use is objectionable.

The object of my invention, generally stated, is to provide a device for readily applying a tire chain to a vehicle wheel and removing it therefrom and for securely holding the chain in place, which shall be simple and efficient in operation, and which may be readily and economically manufactured, installed and removed.

The principal object of my invention is to provide a retaining device which will be extensible along a longitudinal axis and relatively inexpansible in a plane at right angles to the longitudinal axis.

An important object of my invention is to provide a ring-like pneumatic retaining device which is extensible in a circumferential direction, and substantially inexpansible in a transverse plane.

Another important object of my invention is to provide for holding a vehicle tire chain in position on the tire.

Another object of my invention is to provide readily extensible means for applying and removing an automobile tire chain.

Still another object of my invention is to provide for pneumatically applying and removing automobile tire chains.

A further object of my invention is to provide a tire chain having the inside retaining member formed of an inflatable rubber tube extensible circumferentially.

Other objects of my invention will, in part, be obvious, and in part, appear hereinafter.

Accordingly, my invention is disclosed in the embodiment hereof shown in the accompanying drawings and comprises the features of construction, combination of elements, and arrangement of parts, which will be exemplified in the construction hereinafter set forth and the scope of the application of which will be indicated in the appended claims.

For a more complete understanding of the nature and scope of my invention, reference may be had to the following detailed description, taken in connection with the accompanying drawings, in which:

Figure 1 is a side elevational view of a tire chain organized in accordance with my invention, the retaining member being fully extended;

Fig. 2 is a view similar to Fig. 1, the retaining member being contracted;

Fig. 3 is a cross-sectional view of the retaining member as it appears in the contracted form;

Fig. 4 is a cross-sectional view of the retaining member in expanded form;

Fig. 5 is a detail view, partly in section, and partly in side elevation, showing the particular construction of the retaining member;

Fig. 6 shows my novel antiskid device mounted for operation on a vehicle wheel; and Fig. 7 is a view similar to Fig. 6 showing the antiskid device in place on a vehicle wheel with the retaining device in the extended position.

According to my invention, I have dispensed with one of the ordinary side chains of the customary tire chain, and have substituted therefor a pneumatic member, ring-like in form, to which the cross-chains may be attached. The retaining member is formed of resilient material, such as rubber, and is arranged to be inflated. When inflated, the retaining device extends circumferentially, but due to the provision of a spirally wrapped holding member, it is not permitted to expand transversely. When fully inflated, the inside diameter of the retaining member is greater than the outside diameter of the tire over which it is to be positioned. As a result, the chain assembly with the retaining member inflated may be readily positioned on a vehicle wheel over the tire and, when deflated, it automatically adjusts itself in operative position and is ready for use.

Referring now particularly to Fig. 1 of the drawings, it will be observed that a chain assembly, shown generally at 10, is there illustrated. The chain assembly 10 comprises an outer side chain 11 which has been illustrated diagrammatically, only one link thereof being shown in detail. The side chain 11 may be provided with a suitable clamping device, but since this forms no part of the invention, the outside chain 11 has been illustrated as being continuous. The usual cross chains 12 are provided, and may be secured to the outside chain 11 in any suitable manner.

As set forth hereinbefore, the inside chain similar to the outside chain 11 of the tire chains of the prior art, has been dispensed with and in lieu thereof, a retaining member 15 has been provided. The retaining member 15 has provided therein a plurality of spaced openings 16 in an integrally formed rib or fin 17 to which the cross chains 12 may be attached.

As illustrated in Figs. 3, 4 and 5 of the drawings, the retaining member 15 has integrally formed therewith, a spirally wrapped holding member 18. This member is preferably formed of a cord or other like material, which is substantially inextensible. The holding member 18 may be spirally wrapped around various layers of the member going to make up the retaining member 15 and when it is finally vulcanized under heat and pressure, the holding member 18 becomes an integral part of the device.

As illustrated in Fig. 1 of the drawings, a valve 19 is provided in a valve stem through which air may flow to inflate the retaining device 15. On inflation, the retaining device 15 assumes a position, as shown in Fig. 4 of the drawings. The retaining device is prevented from expanding transversely or in the plane of the drawings, as shown in this figure, because of the holding member 18. However, due to the fact that the holding member 18 is spirally wrapped, the retaining device 15 is permitted to extend circumferentially and, therefore, its inside diameter is increased while the cross-sectional area remains substantially the same.

As shown in Figs. 3, 4 and 5 of the drawings, the holding member 18 may be applied in several layers or wrappings. One of these wrappings may be positioned in the main circular portion of the retaining device 15 while another may be integrally formed with the rib or fin 17.

In operation, the chain assembly 10 may be applied to a vehicle wheel, shown generally at 20, Figs. 6 and 7, having a tire 21 which is mounted to rotate within the fender 22 of an automobile. In order to apply the chain assembly, air pressure is applied to the retaining device 15 through the valve stem 19 until the device is extended to the position shown in Fig. 1 of the drawings. In this position, the cross chains will be drawn substantially taut and, therefore, it is possible to remove any kinks which might otherwise be present in the chains. The device is then positioned immediately in the rear of the wheel on which it is to be placed, and the vehicle is backed over it. The retaining device 15 may then be positioned over the wheel, as shown in Fig. 7 of the drawings. The air may then be permitted to escape through the valve stem 19 and the retaining device 15 collapses to the position shown in Fig. 6 of the drawings. Fig. 3 of the drawings shows, in detail, the shape of the cross-section of the retaining device 15 when in the contracted position. It will be observed that in such position, a minimum of interference will result on the inside of a wheel and that the necessary tension will be applied to the cross chains because of the residual stress in retaining device 15.

The retaining device 15 is so constructed as to have a high degree of resiliency, and to exert a sufficient pull on the cross chains 12, when in the collapsed state, so as to hold them securely against the outer surface of the tire 21, even though the vehicle is operated at a relatively high speed. However, a slight creeping action of the cross chains along the tire will take place, so that wear of the tire surface will not occur due to the chain assembly remaining in one position. Since the device tends to collapse into as small a shape as possible, it assumes an oblong form of cross-section, rather than circular, as shown in Fig. 4 of the drawings.

When it is desired to remove the chain assembly 10, it is merely necessary to apply pressure through the valve stem 19 to re-inflate the retaining device 15. The chain assembly may then be readily removed from the wheel 20 and on being again deflated, may be readily stored in the vehicle, since in the collapsed condition, it occupies a very small space.

By means of the pneumatic retaining device, it is possible to readily apply the chain assembly 10 without necessitating connecting together a suitable coupling device on the inside of the wheel. With the present type of construction of automobiles, in which the fenders fully cover the wheels, it is extremely difficult to readily apply a tire chain. With my device it is only necessary to slip the chain assembly over the wheel and to operate a valve which may be readily accessible to apply the chain assembly. A more important advantage, however, accrues from the use of the resilient retaining device 15, since by this means the cross chains 12 are securely held in position, and wear is automatically compensated for, so that there is no likelihood of any of the cross chains striking a fender under normal operating conditions.

While I have illustrated the retaining device 15 as being particularly applicable for use in connection with a tire chain assembly, it is apparent that it has many other applications. Therefore, it is intended that all matter shown in the accompanying drawings and set forth in the foregoing specification shall be interpreted as illustrative, and not in a limiting sense.

I claim as my invention:

1. An antiskid device comprising a torroidal pneumatic member of rubber-like material, means tending to prevent said member from expanding in a transverse plane while permitting circumferential extension, holding means integrally formed with said member to permit attachment thereto, connecting means attached to said holding means, and a common means secured to said connecting means.

2. An antiskid device comprising a ring-like inflatable member, restraining means spirally disposed around said member, thereby permitting said member to distend substantially only in a circumferential direction, circumferential holding means formed with said member to permit attachment thereto, connecting means attached to said holding means, and a common means secured to said connecting means.

3. An antiskid device comprising a ring-like inflatable member composed of resilient material, a substantially inextensible restraining member spirally disposed around said member whereby said member is permitted to expand substantially only circumferentially, a circumferential rib integrally formed with said member to permit attachment thereto, connecting means attached to said rib, and a common means secured to said connecting means.

4. An antiskid device comprising a ring-like inflatable member composed principally of rubber, a cord spirally disposed and integrally formed in said member, thereby permitting said member to distend circumferentially and tending to prevent it from expanding transversely, an outwardly extending ridge integrally formed with said member and provided with transverse openings to permit attachment thereto, connecting means disposed in said transverse openings, and a common means secured to said connecting means.

5. An antiskid device for a vehicle wheel comprising, in combination, a substantially inextensible outside member, an inside endless inflatable circular member, and means interconnecting said members and disposed to extend over the wheel.

6. An antiskid device for a vehicle wheel comprising, in combination, an outside member, an inside pneumatic circular member characterized by being circumferentially extensible and substantially inexpansible transversely, and means interconnecting said members and disposed to extend over the wheel.

7. An antiskid device for a vehicle wheel comprising, in combination, a substantially inextensible outside member, an inside circular pneumatic member, means tending to prevent said pneumatic member from expanding in a transverse plane while permitting circumferential extension, and cross-connecting means between said members and disposed to extend over said wheel.

8. An antiskid device for a vehicle wheel comprising, in combination, an outside chain member, an inside endless circular inflatable member composed principally of rubber, said member being extensible to such a degree that it may be passed over the vehicle wheel on inflation, and a plurality of cross chains interconnecting said members.

9. An antiskid device for a vehicle wheel comprising, in combination, an outside chain member, an inside circular inflatable member composed prncipally of rubber, a restraining member spirally disposed around said inside member, and a plurality of cross chains interconnecting said outside and inside members.

10. An antiskid device for a vehicle wheel comprising, in combination, an outside chain member, an inside circular inflatable member composed principally of rubber, a restraining member spirally disposed around said inside member, an outwardly extending ridge integrally formed with said inside member and provided with transverse openings, and a plurality of cross chains secured in said openings to said inside member and connected to said outside member.

FRANK R. EDGARTON.